Dec. 15, 1964  C. KAMONDY  3,161,421
REVERSING MECHANISM FOR PASSENGER PROPELLED VEHICLE
Filed Feb. 12, 1963
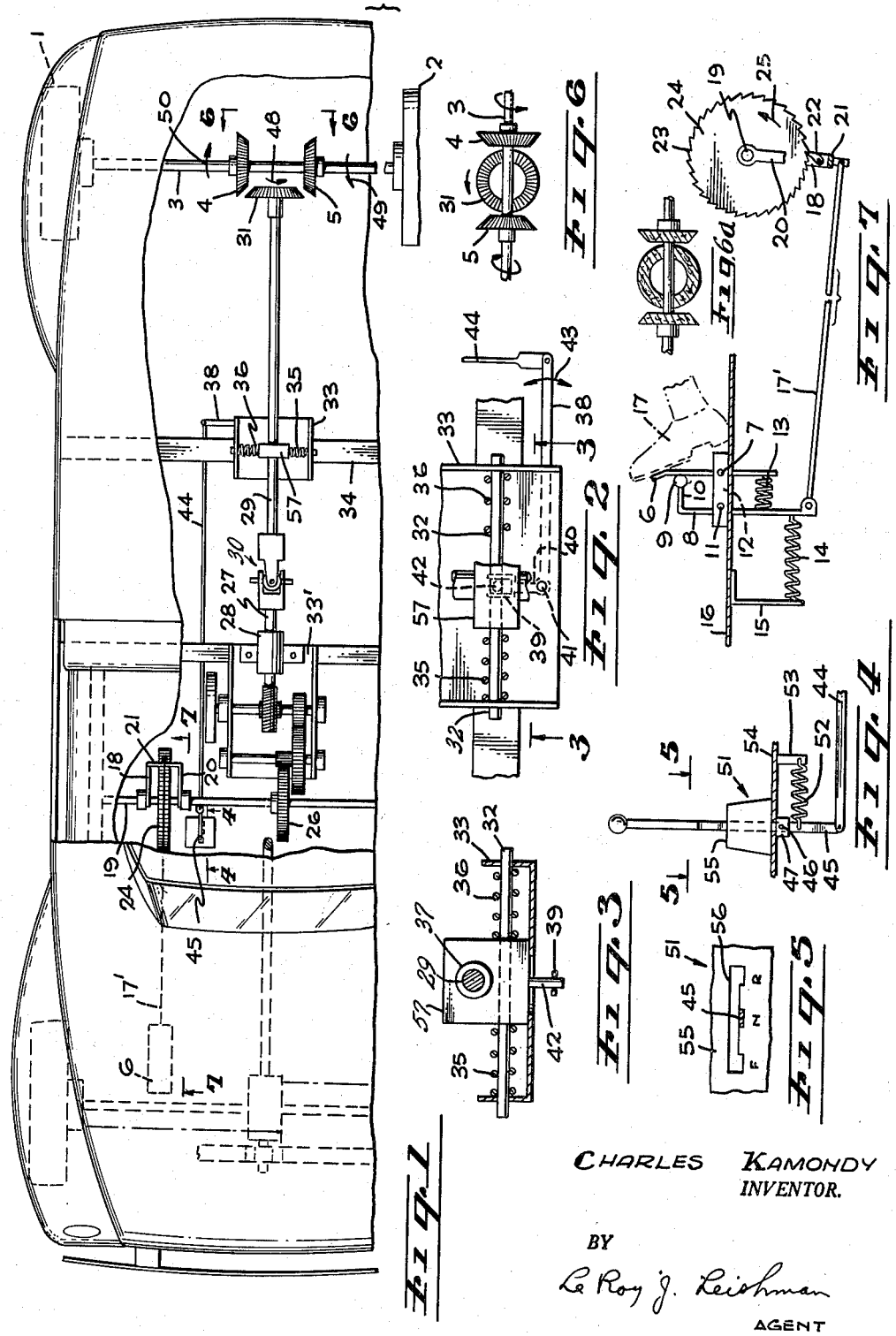
CHARLES KAMONDY
INVENTOR.
BY
Le Roy J. Leishman
AGENT United States Patent Office 3,161,421
Patented Dec. 15, 1964

3,161,421
REVERSING MECHANISM FOR PASSENGER
PROPELLED VEHICLE
Charles Kamondy, 7857 Paso Robles Ave.,
Van Nuys, Calif.
Filed Feb. 12, 1963, Ser. No. 257,976
5 Claims. (Cl. 280—237)

The invention herein described pertains to passenger-propelled vehicles, and more particularly to a reversing mechanism especially adapted to vehicles of the type described for children.

In toy automobiles or passenger-propelled vehicles, those using universal joints for connecting the drive shaft have usually included unnecessarily complex reversing mechanisms, and those that have been propelled by pedals of the bicycle type or of the type in which the pedals are connected by links to staggered offset portions of a laterally disposed axle connected to the wheels, have generally depended upon pedaling backwards in order to secure reverse motion.

Accordingly, one of the objects of the present invention is to provide a very simple reversing mechanism.

A further object is to provide a mechanism of the type described in which the reversing is accomplished by angularly shifting at least a part of the drive shaft in a lateral direction.

Yet another object is to provide easily operable means whereby the passenger may operate the aforementioned reversing mechanism.

Still other objects will become apparent as the specification proceeds.

In the drawings:

FIG. 1 is a top view, partly broken away, showing the reversing mechanism and the means for operating the same.

FIG. 2 is an enlarged view, partly broken away, of the mechanism whereby at least a portion of the drive shaft is moved laterally.

FIG. 3 is a section taken substantially on line 3—3 of FIG. 2.

FIG. 4 is an enlarged section taken on line 4—4 of FIG. 1.

FIG. 5 is a section taken on line 5—5 of FIG. 4, and FIG. 6 is a section taken on line 6—6 of FIG. 1.

FIG. 6a is similar to FIG. 6 but illustrates the use of bevelled wheels having frictional driving surfaces instead of teeth.

FIG. 7 is a section taken on line 7—7 of FIG. 1.

The novel features of my invention are probably most readily made apparent by first describing in general terms the mechanism operated by the passenger's feet and how the power therefrom is transmitted to the driving wheels 1 and 2, FIG. 1. At least one of these wheels may be rigidly secured to a rear axle 3, or it may be otherwise mounted so that there is a positive driving connection between the axle and such rear wheel, which, for purposes of illustration, we shall consider to be the wheel 1.

The direct mounting of the opposite rear wheel 2 on the axle 3 would of course result in encountering difficulty in negotiating curves, which necessarily require that one of the wheels moves in a larger circle than the other, requiring faster movement. In toy vehicles, this difficulty is sometimes tolerated; or it may of course be avoided by applying the driving force to one wheel only or by interposing differential gearing or an equivalent somewhere in the system. For purposes of illustration, however, we shall assume that the illustrated portions of axle 3 are continuous, and two beveled wheels 4 and 5 are mounted on this shaft with their converging sides facing each other. In this case, their tapering sides will converge toward a point located intermediate the two beveled wheels. These wheels may be beveled gears, or, as an alternative, the portions of the wheels where the teeth would ordinarily be located may be covered by a material having high frictional properties.

The power that is to be transmitted to these wheels 4 and 5 is provided by the passenger of the vehicle by means of mechanism now to be described. An operating pedal is provided for each of the passenger's feet. Since both of these and the immediately connected parts are identical, only one of these mechanism will be described and that will be the one operated by the passenger's right foot. The pedal 6, FIGS. 1 and 7, is pivoted at 7 intermediate its two ends. This pedal contacts a ball, roller or ball bearing 9 on a horizontally extending arm 10 of the otherwise generally vertical lever 8 which is pivoted at 11 on a bracket 12 which may also be used for pivoting the pedal 6 by means of the aforementioned pivot 7. A compression spring 13 is interposed between the levers 8 and 6 below their pivot points in order to keep their upper ends in contact and to prevent the lever 6 from moving independently of lever 8.

An extension spring 14 is connected between the lower end of lever 8 and a bracket 15 suitably mounted to the chassis or floor 16. Spring 14 normally biases lever 8 to a position in which the upper end is considerably to the right of the intermediate position shown, so that the movement of the foot 17 of the operator will press the pedal 6 from a position considerably to the right of the intermediate position pictured in the drawing to a position on the opposite side of a central vertical line. A link 17' is pivotally connected at oppsite ends to the lower end of the lever 8 and to the outer end of an angularly movable member 18 mounted for rotation on a shaft 19. Member 18 may be an arm of a U-shaped element whose opposite arms are linked together by an integral connection 21, FIG. 1. The arm 18 or optionally, the intermediate portion 21 of the U-shaped member carries a spring-biased pawl 22 which engages the ratchet teeth 23 of the ratchet wheel 24 rigidly mounted on the shaft 19. Each time the passenger presses on the foot pedal 6, the lower end of the U-shaped member of which arm 18 is a part will move from left to right, with the result that the spring-biased pawl 22 will rotate the ratchet wheel 24 in a counterclockwise direction as indicated by the arrow 25. When the passenger releases the pressure of his foot upon the pedal 6, the spring 14 will pull the link 17 and arm 18 toward the left with the result that the pawl 22 will slip over the top edges of the teeth 23, permitting the pawl to get a fresh "bite" on the ratchet wheel to effect its further rotation in response to the subsequent stroke of the operating pedal 6.

A gear 26, FIG. 1, is secured to the shaft 19, and this gear meshes with other gears of a gear train which transmits motion from the shaft 19 to the short primary shaft 27, appropriately journaled in a bearing 28 secured to gear frame 33' carried by the frame of the chassis. The primary shaft 27 is connected to a second shaft 29 by a flexible or loose coupling or universal joint 30. One end of the shaft 29 is of course supported in the flexible coupling or universal joint 30, this support permitting the shaft to be moved angularly while rotating as a result of this positive connection to the coupling 30. The other end of this shaft carries a wheel 31, which is rigidly secured to the shaft. The wheel 31 is interposed between the wheels 4 and 5 mounted on the shaft 3. An intermediate portion of the shaft 29 between the universal joint 30 and the wheel 31 is supported in a bearing 37, FIG. 3, mounted in a laterally movable member 57 which is slidably mounted on a rod 32. This rod is rigidly secured in a frame 33 mounted on a member 34 that is a part of the main frame of the chassis structure. Member 57, supporting the intermediate bearing 37 for shaft 29, is urged to a central position by two compression springs 35 and 36 surrounding the rod 32 on opposite sides of the sliding block 57 that supports the bearing.

An L-shaped lever 38 having a forked end 39 on its short arm 40 is pivoted at 41 on the bracket member 33. The forked end 39, FIGS. 2 and 3, straddles a pin 42 rigidly secured to the laterally movable block 57. It will readily be apparent that if the lever 38 is moved angularly as indicated by the arrow 43 that the yoke or fork 39, by its engagement with the pin 42, will move the bearing block 57 either to the right or the left as viewed in FIGS. 2 and 3, carrying the shaft 29 with it.

Normally, the wheel 31 is free from engagement with both of the wheels 4 and 5, due to the action of the springs 35 and 36, but the sidewise angular movement of shaft 29 in response to the operation of lever 38 brings the intermediate wheel 31 into engagement with one or other of the wheels 4 and 5. If these wheels are bevel gears, the wheel 31 will of course be a gear that is capable of meshing with either of them, and if the wheels 4 and 5 are merely beveled wheels faced with material having high frictional properties, it will be understood that the wheel 31 must be of the same type in order that rotary motion from the wheel 31 will be transmitted to whichever of the wheels 4 or 5 it may be engaging.

At this point, it may be well to interpose a statement that the wheels 4 or 5 may be non-tapered friction discs and that the wheel 31 may have an appropriate peripheral surface to transmit the rotary movement of this wheel to either of such discs.

If the wheel 31 is rotating in the direction indicated by the arrow 48 while engaging wheel 5, it will cause the shaft 3 to rotate in the direction indicated by 49, thus causing the vehicle to be propelled forward; but if the gear 31, while still turning in the direction indicated by arrow 48, is in engagement with wheel 4, the shaft 3 will be driven in the direction indicated by arrow 50, thus causing the vehicle to move in reverse.

The movement of lever 38, which thus shifts the movement of the vehicle from forward to reverse, or vice versa, is controlled or operated by a lever 45 best seen in FIG. 4. The lower end of lever 45 and the free end of the long arm of lever 38 are pivotally connected by a link 44. Although the springs 35 and 36, through their action in centering the bearing block 57, tend to keep the operating lever 45 in an intermediate or neutral position, as indicated by the letter N on housing 51, an additional spring 52 may be provided between the lever 45 and a bracket 53 attached to the frame member 54 if the link 44 is not constructed of sufficiently rigid material to keep the link taut. In this case, the spring 52, if connected as shown, would be a compression spring, but if the bracket 53 is on the opposite side of the lever, the equivalent spring would be of the extension type.

When the upper end of the lever 45 is moved either to the right or left, as seen in FIG. 4, it must bear toward an extreme position in order that the wheel 31, especially if it is faced with frictional material, will press firmly against whichever of the wheels 4 or 5 it may be engaging so that the motion may be positively transmitted. It is therefore advisable to have some kind of a lock or detent to hold the lever in such position. I provide this in connection with the top plate 55 on the housing 51. This top plate is slotted, as indicated at 56, to permit the shaft or operating lever 45 to pass therethrough and to move laterally therein. Three recesses, indicated by the letters F, N, and R, communicate with this slot and provide grooves or notches into which the lever will slip when moved to either of the three positions indicated. The lever or operating arm 45 is preferably formed of material having sufficient resilience to urge it to the slotted side of the opening 56 so that it will automatically slip into one of the three recesses and remain there in order to hold the intermediate wheel 31 free from engagement with either of the wheels 4 or 5 or to maintain it in firm engagement with one or the other for forward or reverse movement of the vehicle.

It will be obvious to those skilled in the art that the embodiment of my invention hereinbefore described is merely illustrative and that many modifications may be made therefrom and that any of the elements of the appended claims may be replaced by other elements performing the same functions or that they may be reversed or transposed in position or added to, all without departing from the broad spirit of my invention.

The inventor claims:

1. In a passenger propelled vehicle: a primary drive shaft constrained against movement excepting about an axis which is longitudinally disposed with respect to the vehicle; means operable by the passenger's feet for rotating said primary drive shaft; a pair of supporting wheels disposed on opposite sides of said axis and rotatable in planes generally parallel thereto; an axle at right angles to said axis, said axle having a positive driving connection to at least one of said supporting wheels; a pair of beveled wheels secured to said axle and tapering toward the portion of said axle that lies between said beveled wheels; a second drive shaft for selectively transmitting rotary motion from said primary drive shaft to one or other of said beveled wheels, one end of said second shaft connected to said first shaft by a universal joint; a third beveled wheel attached to the other end of said second shaft and tapering toward a point beyond said end, said third beveled wheel disposed between said pair of beveled wheels; a bearing for said second shaft disposed between said universal joint and said third beveled wheel; means for supporting said bearing, said means comprising (a) a bracket that is rigidly mounted with respect to said vehicle, (b) a rod carried by said bracket and extending transversely across said second shaft, (c) a block for housing said bearing, said block so mounted on said rod and said rod so supported by said bracket that the block and the bearing supported thereby may be moved laterally of said second shaft to bring said third beveled wheel selectively into engagement with either of said pair of beveled wheels; and manually controllable instrumentalities for effecting the recited movement of said block, said instrumentalities comprising (a) a pin integral with said block extending therefrom in a direction transverse to said rod and to said second shaft, and (b) a bell-crank lever pivotally mounted on said bracket, one arm of said lever having a forked end straddling said pin for moving said block transversely of said second shaft upon movement of the other arm of said lever.

2. The combination of claim 1 in which the beveled surfaces of said beveled wheels are faced with material having a high coefficient of friction to facilitate the transmission of motion and power from said third beveled wheel to either of said pair of beveled wheels.

3. The combination of claim 1 in which the beveled wheels are beveled gears.

4. The combination of claim 1 with the addition of resilient means for urging said block to a position in which said second shaft will be so disposed that said third wheel will normally be free from engagement with either of said pair of beveled wheels.

5. In a passenger propelled vehicle: a primary drive shaft constrained against movement excepting about an axis which is longitudinally disposed with respect to the vehicle; means operable by the passenger's feet for rotating said primary drive shaft; a pair of supporting wheels disposed on opposite sides of said axis and rotatable in planes generally parallel thereto; an axle at right angles to said axis, said axle having a positive driving connection to at least one of said supporting wheels; a second pair of spaced parallel wheels secured to said axle; a second drive shaft for selectively transmitting rotary motion from said primary drive shaft to one of other of said second pair of wheels, one end of said second drive shaft connected to said first drive shaft by a non-rigid motion-transmitting coupling; a third wheel attached to the other end of said second shaft and disposed between said second pair of wheels with its plane of rotation at right angle to the planes of rotation of said second pair of wheels; a laterally movable bearing for said second shaft disposed between said coupling and said third wheel; and means for moving said bearing laterally to bring said third wheel into engagement with either wheel of said second pair, said means comprising (a) a manual control accessible to said passenger, (b) a member carrying said bearing and mounted for movement in a direction substantially at right angles to said second shaft, (c) means urging said member to a central position in which said second shaft will be so disposed that said third wheel will be free from engagement with either of said pair of wheels, (d) a vertical pin in said member, (e) an L-shaped lever having a first arm which in an intermediate operative position thereof is disposed substantially parallel to said second shaft and a second arm extending substantially at right angles to said first arm, said lever rotatable on a vertical axis extending therethrough substantially at the juncture of said arms, said first arm terminating in a fork straddling said pin, and (f) instrumentalities operatively connected to said second arm and to said control whereby said control may effect the angular movement of said lever in either rotative direction.

References Cited in the file of this patent
UNITED STATES PATENTS

| | | |
|---|---|---|
| 350,017 | Rogers | Sept. 28, 1886 |
| 824,129 | Mason | June 26, 1906 |
| 1,050,454 | Hall | Jan. 14, 1913 |
| 1,304,790 | Maulden et al. | May 27, 1919 |
| 1,455,389 | Crandell | May 15, 1923 |
| 1,613,356 | Norrish | Jan. 4, 1927 |
| 1,627,180 | Hynes | May 3, 1927 |
| 1,739,628 | Bemont | Dec. 17, 1929 |
| 2,967,596 | Page | Jan. 10, 1961 |